United States Patent
Taylor et al.

(10) Patent No.: US 7,143,542 B2
(45) Date of Patent: Dec. 5, 2006

(54) FLYING INSECT TRAP

(75) Inventors: Larry R. Taylor, Grand Island, NE (US); C. Ronald Lambert, Columbus, NE (US)

(73) Assignee: Paraclipse, Inc., Columbus, NE (US)

( * ) Notice: Subject to any disclaimer, the term of this patent is extended or adjusted under 35 U.S.C. 154(b) by 0 days.

(21) Appl. No.: 11/009,725

(22) Filed: Dec. 10, 2004

(65) Prior Publication Data
US 2005/0126069 A1    Jun. 16, 2005

Related U.S. Application Data

(60) Provisional application No. 60/529,053, filed on Dec. 12, 2003.

(51) Int. Cl.
*A01M 1/04* (2006.01)
(52) U.S. Cl. .......................... 43/113; 43/114
(58) Field of Classification Search .......... 43/113, 43/114, 107
See application file for complete search history.

(56) References Cited

U.S. PATENT DOCUMENTS

| | | | | |
|---|---|---|---|---|
| 4,876,822 A | * | 10/1989 | White | 43/113 |
| 5,513,465 A | * | 5/1996 | Demarest et al. | 43/113 |
| 5,651,211 A | * | 7/1997 | Regan et al. | 43/113 |
| 5,722,199 A | * | 3/1998 | Demarest et al. | 43/113 |
| 5,915,948 A | * | 6/1999 | Kunze et al. | 43/114 |
| 5,950,355 A | * | 9/1999 | Gilbert | 43/113 |
| 5,974,727 A | * | 11/1999 | Gilbert | 43/113 |
| 6,108,965 A | * | 8/2000 | Burrows et al. | 43/113 |
| 6,108,966 A | * | 8/2000 | Otomo et al. | 43/113 |
| 6,289,629 B1 | * | 9/2001 | Greening | 43/113 |
| 6,393,759 B1 | * | 5/2002 | Brown et al. | 43/113 |
| 6,397,515 B1 | * | 6/2002 | Brown et al. | 43/113 |
| 6,560,919 B1 | * | 5/2003 | Burrows et al. | 43/113 |
| 6,655,078 B1 | * | 12/2003 | Winner et al. | 43/114 |
| 6,886,292 B1 | * | 5/2005 | Studer et al. | 43/113 |

* cited by examiner

*Primary Examiner*—Kurt Rowan
(74) *Attorney, Agent, or Firm*—Emrich & Dithmar LLC

(57) ABSTRACT

A decorative fly trap for household use includes a sconce having a housing including a bottom section and an overhead cover partially enclosing a source of UV light, and an adhesive trapping medium. The cover includes an intermediate surface extending from behind the UV light source upwardly and over the UV light source to a location forward of the light source. A base mount is removably assembled to the bottom of the unit so that the unit may either be wall mounted or supported on a horizontal surface, such as a table. A UV reflective coating is applied to the interior exposed surfaces of the housing including the curved intermediate surface of the cover to enhance the reflection of UV light out into the room and downwardly in front of the to attract insects. The housing includes a horizontal aperture for admitting reflected light from within the sconce onto a front surface of a lower tier of the bottom section for attracting insects as well as for presenting an attractive appearance. The angle and position of the UV lamp is set relative to an upright UV reflector and the horizontal trapping medium to enhance the transmission of reflected UV light out in front of the trap.

4 Claims, 6 Drawing Sheets

FLYING INSECT TRAP

RELATED APPLICATION

This application claims the benefit of the filing date of co-pending U.S. Provisional Application No. 60/529,053, filed Dec. 12, 2003.

FIELD OF THE INVENTION

This invention relates to a flying insect trap; and, more particularly, to a flying insect trap which has particular utility for home use or residential use, as distinguished, for example, from larger traps more commonly used in food processing areas or restaurant eating areas.

BACKGROUND OF THE INVENTION

Flying insect traps are known to use adhesive trapping medium to fix flies, or other flying insects, alighting upon the medium. The insects are attracted by a source of ultraviolet light, and they are further attracted by the use of pheromones to an adhesive medium. A primary object of such fly traps has been to create a source of ultraviolet (UV) light sufficient to attract the flying insects to the trap because it is fix the insects to an adhesive board or conveyor within the trap, as a more desirable, sanitary way of handling the insects. However, in the past, flying insect traps using adhesive trapping medium and a source of UV light to attract the insects have been primarily directed to commercial applications, rather than household uses.

SUMMARY OF THE INVENTION

The present invention is directed to a flying insect trap which is adapted for home and residential use. One feature of the instant trap uses an adhesive medium to fix the insects and a source of UV light to attract them. The unit is in the form of an attractive wall sconce. The unit has a removable base mount so it may be either mounted on a wall without the base mount; or it may be secured to the base mount, and the unit set up on a horizontal support surface, such as a table or desk. This feature is particularly suited for household use and provides convenience and versatility to the user since the unit may be converted between wall-mounted and table-supported applications.

In addition, the present unit includes a sconce which has an overhead cover which lies above the trapping medium and the ultraviolet light source mounted within the sconce so that when looking from above, one cannot see the light source directly. This prohibits ultraviolet light from emanating either directly or indirectly onto the wall above the unit whether the unit is mounted to a wall or placed on a support surface adjacent a wall using the base mount.

The cover of the unit includes an intermediate wall which extends upwardly and forwardly from the rear of the unit. In particular, the intermediate wall has a reflective surface which extends upwardly and forwardly from the rear of the unit in the general form of a shell so that light which is reflected from the intermediate wall of the cover is directed outwardly and downwardly of the unit. The cover also includes a top wall which is formed integrally with the intermediate surface and completes the finished look of the cover. The sconce also includes a bottom section beneath the cover which has a front wall and sidewalls which extend in front of and around the UV light source and the trapping medium so as to shield them from direct view by persons in the room when the unit is mounted or set at eye level or above.

At the front, lower portion of the bottom section of the sconce, which is tiered, there is provided an opening in a generally horizontal portion of the bottom section of the sconce. Below this horizontal light-emitting opening in the lower portion of the bottom section of the sconce, there is a generally upright wall to the rear of the opening (on a lower tier) so that light reflected off the inner front surface of the bottom section of the sconce reflects downwardly and rearwardly through the horizontal opening onto the lower upright surface of the front wall of a lower tier of the sconce. This arrangement provides not only an attractive lighted wall sconce, making it appear more like an actual lighting fixture, but it also provides an upright reflective surface in the front of the unit which is illuminated by UV light for attracting insects at a viewing level beneath the unit.

The base mount has a convenient structure for mounting or removing the sconce on a table top without the use of tools. This includes a pair of upright, tapered support dowels for fitting into receiving apertures in the underside of the sconce. This arrangement not only facilitates the mounting of the sconce to the mounting base, but it provides an easy and reliable means of taking the sconce off the base mount if desired, without the need for tools or special fittings or parts.

It has been found that the unit has an enhanced ability to attract and capture flying insects, particularly flies, by (i) providing the intermediate, reflective wall of the cover for broadcasting UV light in front of the unit and into the room, (ii) coating the lower surface of the intermediate wall of the cover of the sconce, as well as the inner surface of the lower section of the sconce, with a UV-reflective coating, (iii) using a generally upright UV booster surface behind the UV light source to reflect UV light from the source out into the room for attracting flies; and (iv) providing a down-lighting aperture to cast UV light on a portion of the front surface of the sconce.

Moreover, the efficiency and productiveness of the unit is enhanced, in the case of using a U-shaped UV lamp with parallel, adjacent illuminated legs in the UV lamp, by inclining the legs of the lamp such that the axes of the two legs of the lamp define a plane extending upwardly and rearwardly at about 45° above the horizontal, and by placing the UV lamp immediately in front of the UV booster surface. The lamp is located lower than an upper, horizontal edge of the bottom section of the sconce, and beneath and to the rear of the cover of the sconce.

The arrangement described directs UV light outwardly into the room and downwardly to a region in front of the sconce, and it also provides an illuminated surface toward the bottom of the front wall of the sconce. Even though each of these factors is not necessary to provide an effective appliance, nevertheless, all of these factors, it is believed, cooperate to provide a more effective and efficient unit for attracting and catching flying insects, particularly common house flies, without transmitting UV light onto a wall above and to the rear of the unit.

Other features and advantages of the present invention will be apparent to persons skilled in the art from the following detailed description of a preferred embodiment accompanied by the attached drawing wherein identical reference numerals will refer to light parts and the various views.

DETAILED DESCRIPTION OF THE ILLUSTRATED EMBODIMENTS

Figure 1:
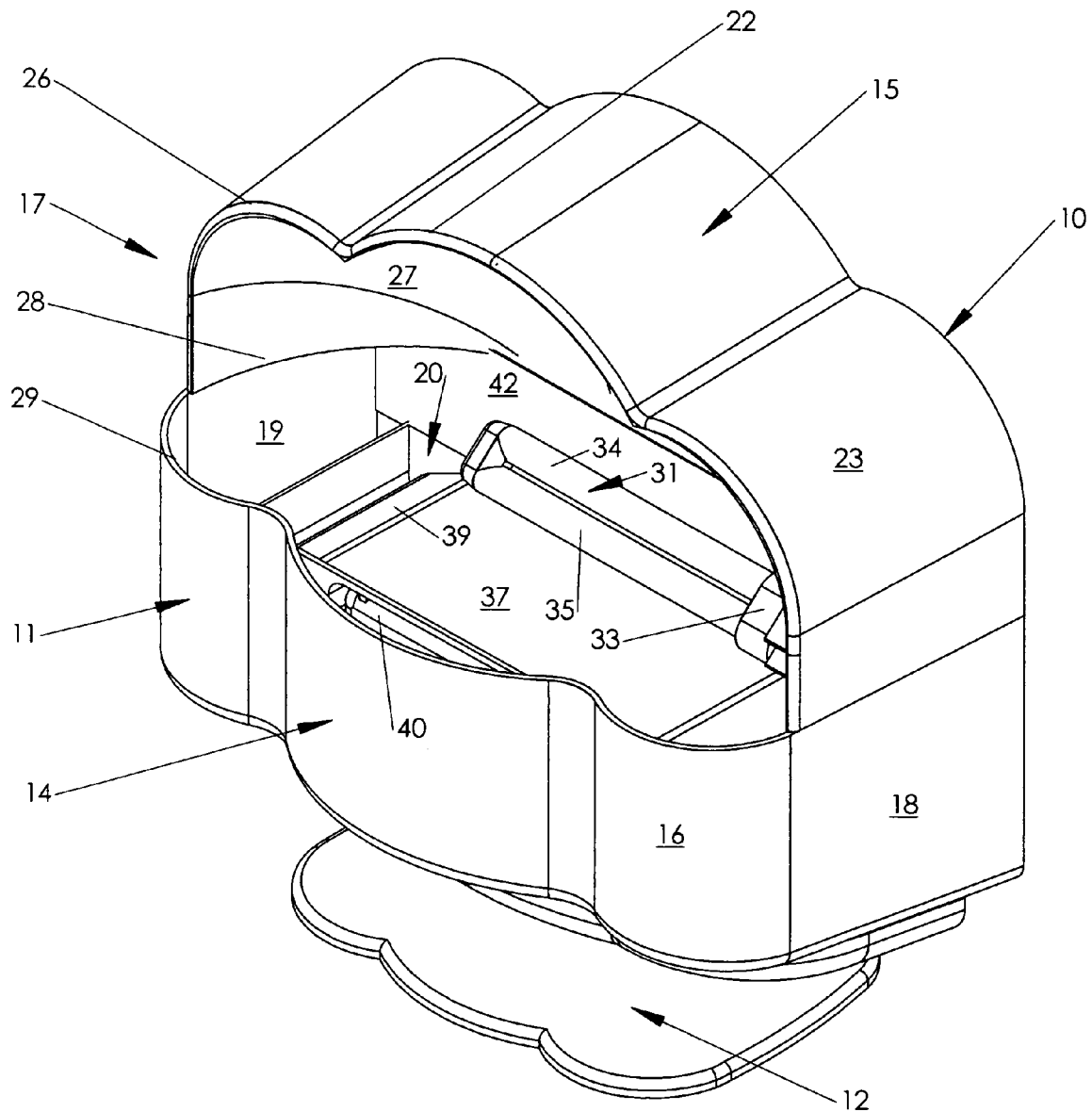
FIG. 1 is an upper, frontal, left perspective of a flying insect trap constructed according to the present invention.

Referring first to FIG. 1, reference numeral 10 generally designates the overall unit comprising a flying insect trap. The unit 10 includes a housing forming a sconce generally designated 11 which is carried by an inner assembly 13 (FIG. 6) which, in turn is removably mounted, in FIG. 1, to a base mount or support generally designated 12, as will be discussed further within.

The sconce 11 includes a bottom section generally designated 14 and a top section or cover generally designated 15. The bottom section 14 and cover 15 are integral, and may be molded, if desired, into a single, integral plastic shell or housing, generally designated 17 (see also FIG. 6), and, in combination with the UV light source, forming the sconce 11. The bottom section 14 includes an upright exterior wall which includes a front wall 16 and left and right side walls 18, 19.

Turning now to the cover 15, it includes a top wall generally designated 23 which extends from the upper edge of the left side wall 18 of the bottom section 14, upwardly and over to the upper edge of the right side wall 19 of the unit. As used herein, "right" and "left" refer to one standing behind the unit and looking into the space being illuminated by the trap.

Figure 2:
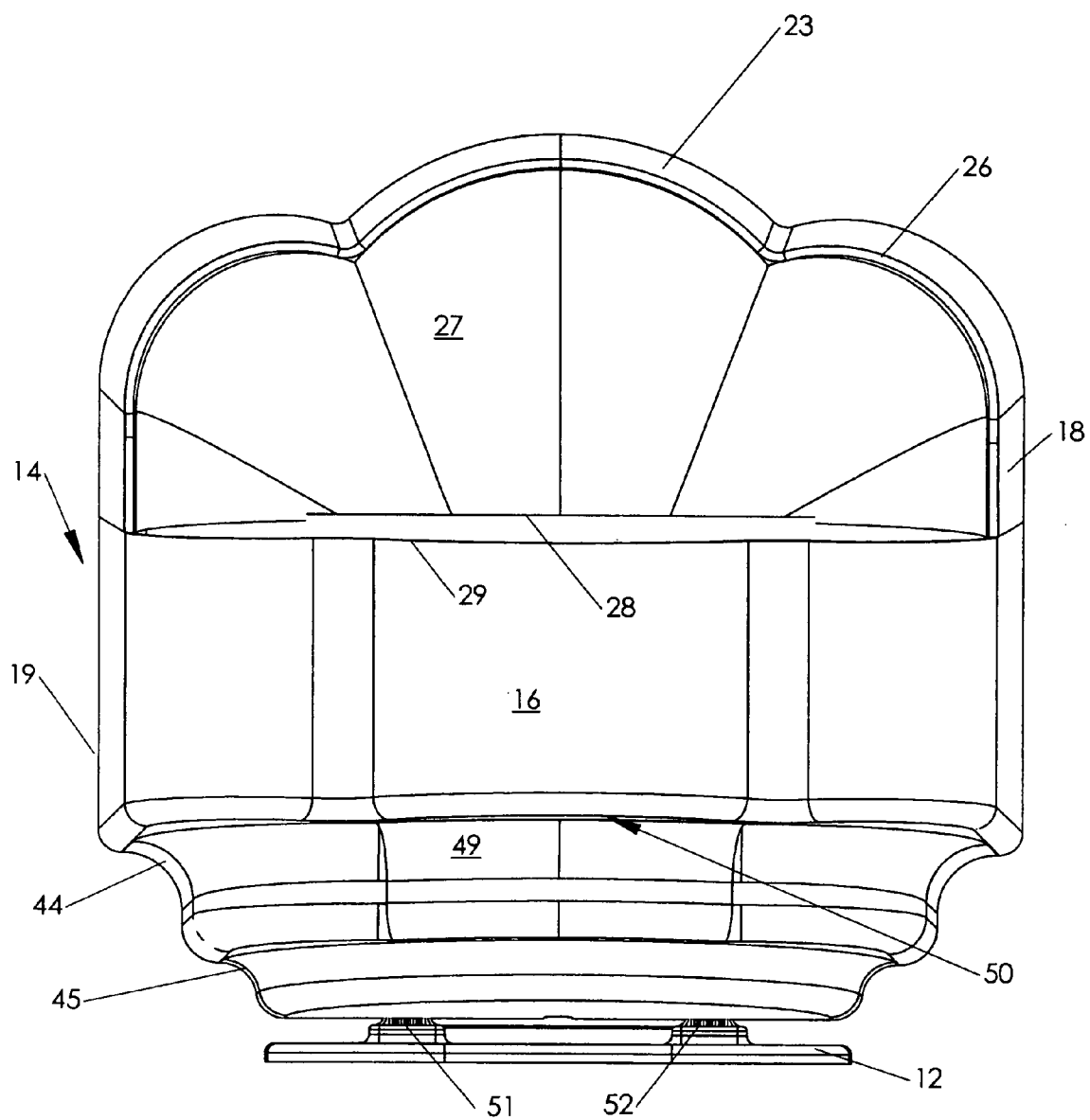
FIG. 2 is a front elevational view of the flying insect trap of FIG. 1.

Beneath the top wall 23 (which includes its depending side portions) is an intermediate wall 27 which is curved and extends from the front edge 22 of the top wall 23, rearwardly and downwardly, in the general form of a band shell or sea shell. That is, the intermediate wall 27 has a lower edge 28, which edge is generally in the same horizontal plane as the upper edge 29 of the walls of the bottom section 14. A ledge 30 (FIG. 6) extends rearwardly of the edge 28 of the intermediate wall 27 for mounting the sconce to the top of the inner assembly 13. The intermediate wall 27 extends from the edge 28 upwardly and is curved so as to enhance its aesthetic appearance, until it becomes integral with the front edge 26 of the top wall 23 (FIG. 2). The shape is intended to direct light from the UV source out into the room in front of the unit.

The housing 17 is mounted to the inner assembly 13 which, in turn, is supported by the base mount 12, in the case where it is desired to mount the unit on a support surface, such as on a table or counter top. In the alternative, the sconce 11 may be removed from the base mount 12 and the unit may be hung on a wall. For this purpose, a rear wall mounting plate 20 (FIG. 6) is adapted to be mounted to a wall by means of conventional wall anchors or fasteners. The housing 17 may then be mounted to the back mounting plate 20 by assembling the apertures 32 of the ledge 30 on a pair of upright ears located at the top of a rear cover plate 21 secured to the mounting plate 20. Keyhole slots 24 located on the mounting plate 20 are used to secure the unit to conventional wall anchors.

Housed within the bottom section 14 of the housing 17, beneath the cover 15 and toward the rear of the unit is a lamp generally designated 31 (FIG. 1) which generates visible light as well as UV light, the latter being a known attractant to flying insects, such as house flies. As seen in FIG. 1, the UV lamp 31 has a general U-shape and is received in a socket 33, the tubular legs of the U-shaped lamp being designated 34 and 35 respectively. Each of the legs 34, 35 is in the form of a cylindrical tube, as is known; and the parallel axes of the tubular sections 34, 35 form an oblique plane with the horizontal. This plane extends upwardly and rearwardly from the forward, lower tubular leg 35 of the lamp. This annular orientation permits both tubular legs 34, 35 to transmit light directly to reflecting surfaces on intermediate wall 27 and the interior surface of bottom section 14.

Beneath the UV lamp 31, and extending forwardly thereof is an adhesive medium generally designated 37. The adhesive trapping medium 37 may be provided in the form of an elongated conveyor web in a replaceable cassette 39, as is described in Reagan et al. U.S. Pat. No. 5,651,211 for "Wall Mounted Trap For Flies and Insects". Alternatively, it may be a conventional glue board of appropriate length and width, as is generally known in the industry. As described in said '211 patent, a motor drives the conveyor-like adhesive trapping medium 37 located within a cartridge or cassette 39 (see also FIG. 6) is always fresh adhesive trapping medium adjacent to and in front of the UV attractant light emanating from the lamp 31. The cartridge 39 rests on and is supported by a motor housing 40 which houses a motor driving the adhesive trapping medium 37.

Located behind the UV lamp 31, and extending to either side thereof and above the UV lamp 31, is an upright, UV reflective booster surface 42. The booster surface 42 may be made of a material which is a good reflector of UV light, such as aluminum for receiving light from the UV lamp and reflecting it directly out into the room, as can be seen best from FIG. 1. The UV booster 42 may be a thin strip of aluminum foil having an adhesive backing for mounting it to the front surface of the cover plate 21. The UV booster may be inclined in a range from 5° forward to 15° backward, if desired.

It will be observed from FIGS. 1, 2 and 3 that the UV lamp 31 is mounted below a horizontal plane defined by the top edge 29 of the bottom section 14; and well behind a vertical plane defined by the forward edge 26 of the cover 15. In this manner, the light from the UV lamp 31 cannot impinge directly onto the wall above the unit when the unit is wall-mounted or placed on a support surface in front of a wall. In the past, units having an open top and permitting the light from the UV lamp 31 to be reflected directly and indirectly onto the wall above the unit over long periods created damage to some wall surfaces and coatings.

Figure 6:
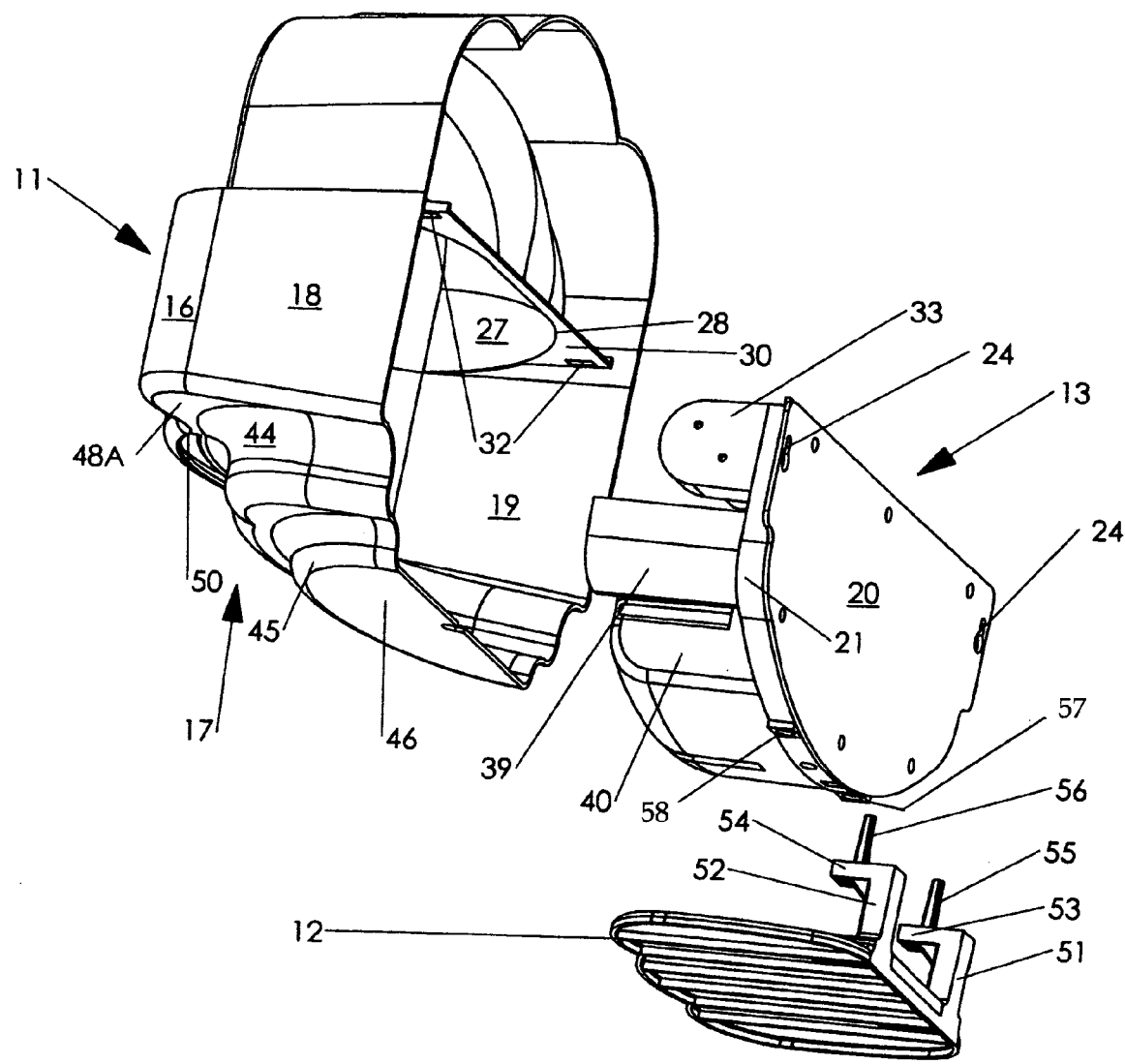
FIG. 6 is a lower, left side and rear perspective view of the trap of FIG. 1 with the outer housing separated from the remainder of the unit.

Turning now to FIGS. 2 and 6, the lower portion of the bottom section 16 of the housing 17 is tiered or stepped. That is, it has two lower tiers which are progressively smaller in horizontal cross section, including an intermediate tier 44 and a base or lower tier 45, which has a flat bottom wall 46.

Figure 3:
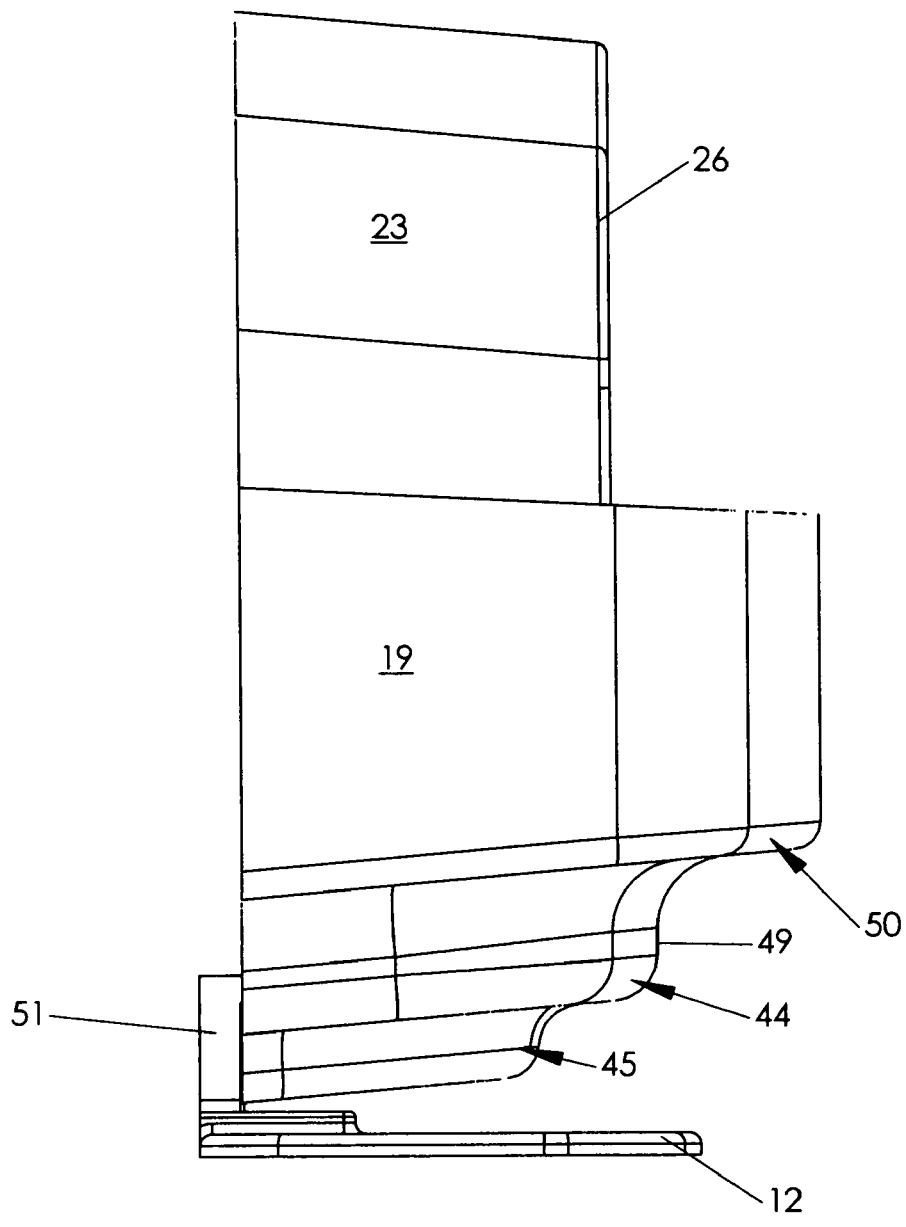
FIG. 3 is a right-side view of the insect trap of FIG. 1.
Figure 4:
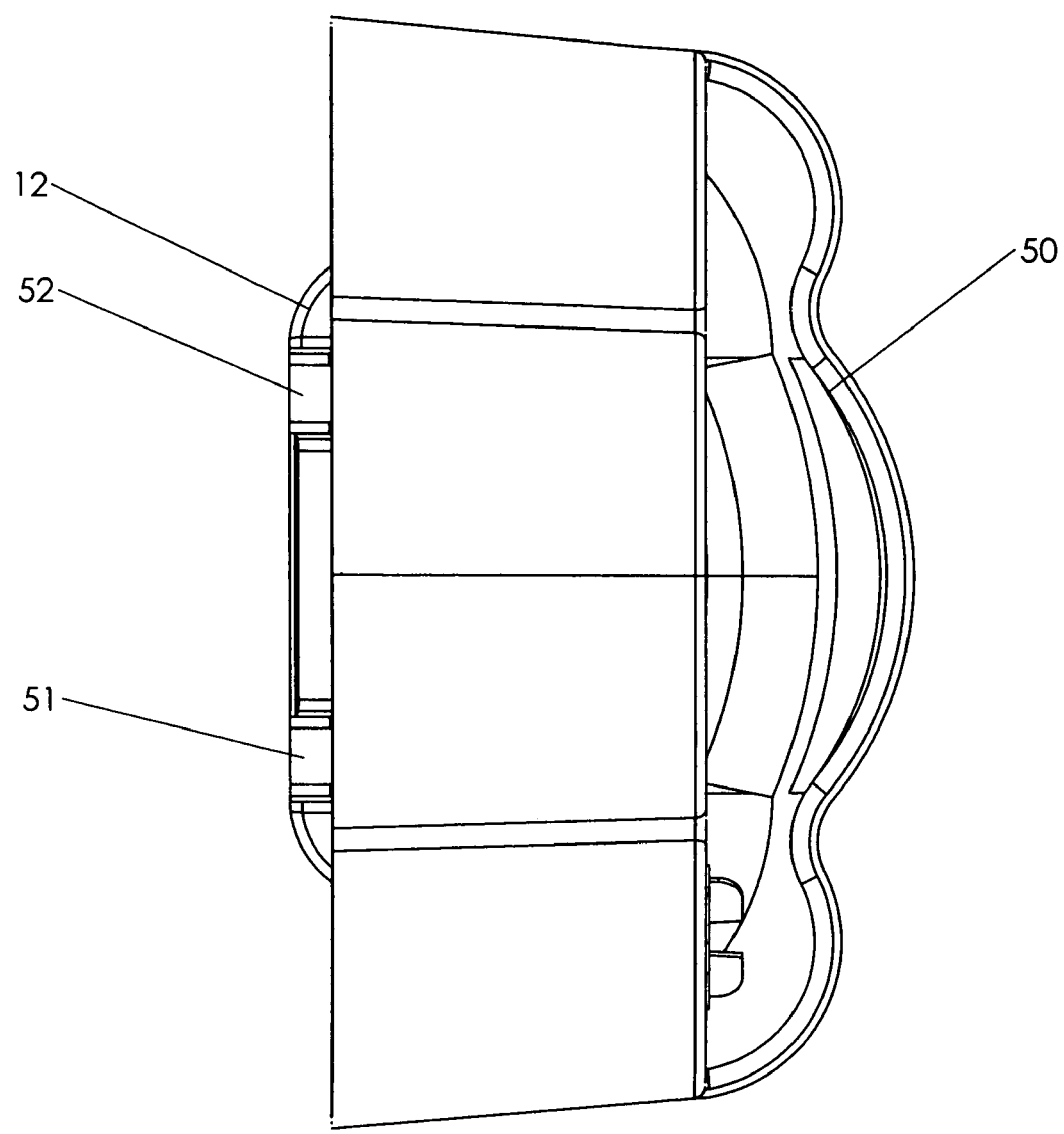
FIG. 4 is a plan view of the insect trap of FIG. 1.
Figure 5:
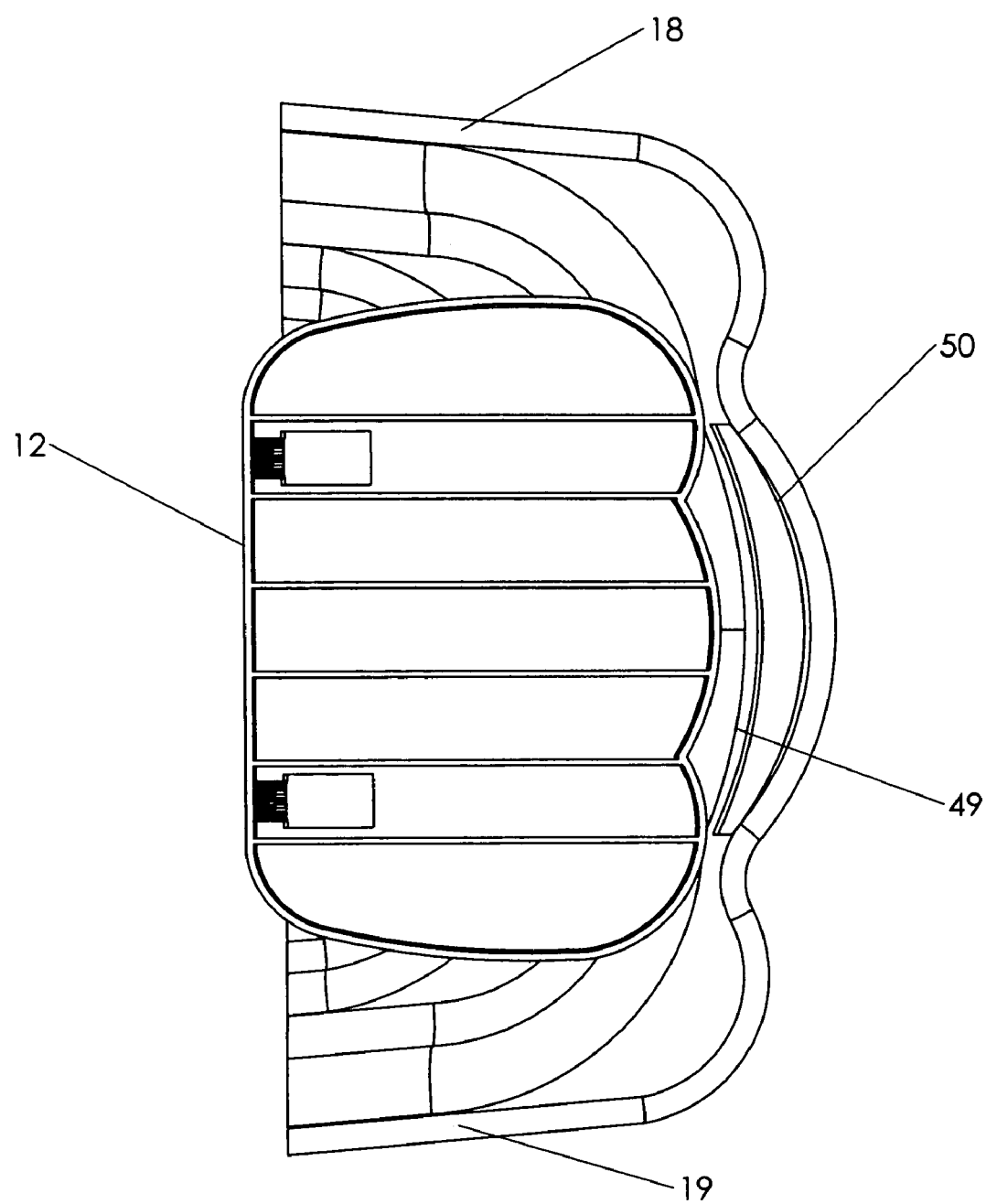
FIG. 5 is a bottom view of the insect trap of FIG. 1.

Turning now to FIGS. 3–5, just above the intermediate tier 44 and located in a horizontal wall 48A (FIG. 6) between the intermediate tier 44 and the side wall 16 of the bottom section 14, is a horizontally elongated aperture in the general form of a crescent, and generally designated 50 in FIGS. 2, 4, 5 and 6. The function of the opening 50 is to permit light originating in the UV lamp 31 and reflected by the intermediate wall 27 and other interior surfaces of the upright walls 16,18 and 19 of the bottom section 14, to be transmitted forwardly and downwardly through the opening 50 and onto a curved, front upright exterior surface generally designated 49 (FIGS. 2, 3 and 5) which is the forwardmost upright surface of the intermediate tier 44 of the bottom section 14.

The reflected light on the front, lower surface 49 provides an attractive element of the sconce, but it also is functional in that it provides a surface which reflects UV light which is clearly visible beneath the unit and from many angles below and in front of the unit.

The lower surface of the intermediate wall 27 of the cover 15 and the inner surface of the front wall 16 of the bottom section 14 and side walls 24,25 of the bottom section 14 are coated with a reflective UV coating for enhancing the reflection of the light generated by the UV lamp 31 out into the room. It has been found that the UV lamp is more effective in attracting and fixing flying insects by using a reflective UV coating on the inner surfaces of the unit. A suitable UV reflective coating for this purpose may be obtained from Spectrum Coatings Labs, Inc. of Providence, R.I.

Turning now to FIGS. 1, 2, 5 and 6 particularly, the base mount 12 includes a base plate 48 adapted to rest on a horizontal surface, such as on a table top or counter. At the rear of the base plate 48, there are formed left and right mounting brackets 51, 52 each having the general shape of an inverted "L" with the foot on top and extending in the forward direction, beneath the inner assembly 13 (but above the bottom wall 46 of the housing or shell 17 when the unit is assembled).

On the horizontal, forwardly extending feet 53, 54 of the brackets 51, 52 respectively are formed upright, tapered dowels 55, 56 which are received respectively in apertures 57, 58 formed on the bottom of the rear cover plate 21 for mounting the inner assembly 13 to the base mount 12, when desired. The inner assembly 13 carries the housing 17 as described above. The unit is thus readily converted between a wall mounted unit and a unit supported on a table top or counter without tools or fasteners.

Having thus disclosed one embodiment of the invention, persons skilled in the art may substitute equivalent elements or materials for those disclosed and to modify the structure illustrated while continuing to practice the principle of the invention; and it is, therefore, intended that all such modifications and substitutions be covered as they are embraced within the spirit and scope of the appended claims.

We claim:

1. A trap for flying insects comprising:
   a source of UV light;
   an adhesive trapping medium for securing insects;
   a housing adapted to be mounted on a wall and including:
      a bottom section forming a partial enclosure for said light source and said trapping medium, and including a solid opaque side wall having front and left and right side portions defining an upper edge substantially entirely above said light source and said trapping medium to prevent light to be transmitted directly out into a room at the height of said light source; and
      a cover above said bottom section and including a reflective wall forming an intermediate wall, said reflective wall extending above and forward of said light source to prevent light from said light source from impinging directly on a wall on which said trap may be mounted and to transmit reflected light directly outward over said upper edge of said bottom section and downwardly in front of said trap; said cover further including a top wall extending from a forward edge of said reflective wall rearwardly toward a wall on which said housing is mounted;
      said bottom section defining a tier at a lower frontal portion thereof to provide a horizontal surface facing downwardly, and a generally upright surface facing outwardly and forwardly of said trap and located rearwardly of said horizontal surface; said horizontal surface defining a downwardly facing opening located in front of said generally upright surface to permit light from said source to be reflected onto the front of said upright surface of said bottom section and capable of being viewed from a location in front of said unit.

2. The apparatus of claim 1 wherein said reflective wall of said cover includes a surface coating of reflective material, said reflective wall characterized as having a curvature from a forward edge, said reflective wall extending rearwardly and downwardly in the form of a shell for receiving light from said light source and reflecting said light outwardly and downwardly in front of said trap.

3. The apparatus of claim 2 wherein said light source comprises first and second elongated legs, each leg having an axis, the axes of said first and second legs of said light source being generally horizontal and generally parallel to one another and defining a plane extending upwardly and rearwardly from said trapping medium, whereby direct light from each leg of said source may impinge directly on said reflective wall and the interior surface of said side wall of said cover.

4. A trap for flying insects comprising:
   a source of UV light;
   an adhesive trapping medium for securing insects;
   a housing adapted to be mounted on a wall and including:
      a bottom section forming a partial enclosure for said light source and said trapping medium, and including a solid opaque side wall having front and left and right side portions defining an upper edge substantially entirely above said light source and said trapping medium to prevent light to be transmitted directly out into a room at the height of said light source;
      a cover above said bottom section and including a reflective surface extending above and forward of said light source to prevent light from said light source from impinging directly on a wall on which said trap may be mounted and to transmit reflected light directly outward over said upper edge of said bottom section and downwardly in front of said trap; and
      a support base having a generally flat surface adapted to be mounted on a horizontal surface, said base being removably securable to said bottom section for supporting said trap and including first and second upright dowel pins spaced laterally apart, and wherein said bottom section of said trap includes first and second recesses adapted to receive said first and second dowel pins of said support base, respectively, for removably securing said trap to said support base for support on a horizontal surface.

* * * * *